Oct. 8, 1940.　　　　H. C. SWIFT　　　　2,216,861
AUTOMATIC ADJUSTMENT
Filed May 1, 1939
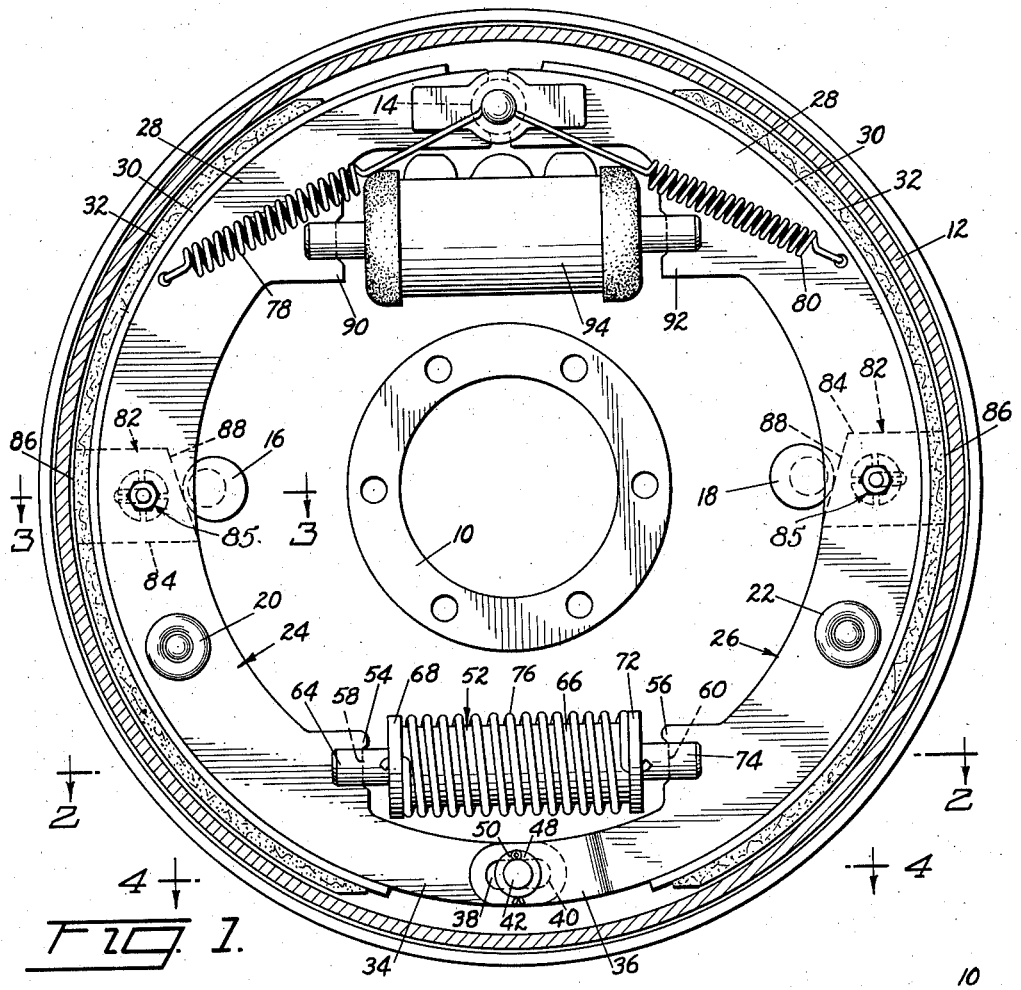
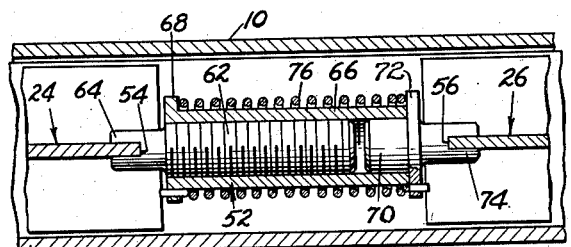
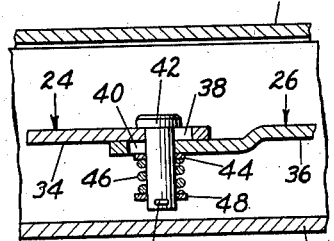
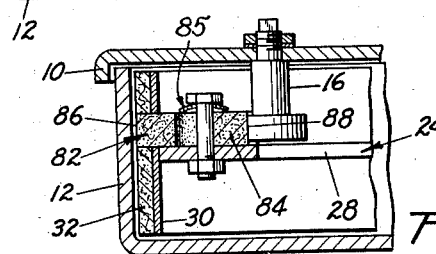
INVENTOR.
HARVEY C. SWIFT
BY
ATTORNEY.

Patented Oct. 8, 1940

2,216,861

UNITED STATES PATENT OFFICE 2,216,861

AUTOMATIC ADJUSTMENT

Harvey C. Swift, Detroit, Mich., assignor to Hydraulic Brake Company, Detroit, Mich., a corporation of California Application May 1, 1939, Serial No. 271,189

10 Claims. (Cl. 188—79.5)

This invention relates to brakes, and more particularly to means for automatically adjusting the friction elements of brakes.

Broadly the invention comprehends means for automatically adjusting the friction element of a brake to compensate for the wear of the friction lining. The invention is particularly adaptable to internal expansible brakes of the duo-servo type wherein two or more friction elements are connected to one another by an expansible member operative to automatically extend the overall length of the friction element to the end that the friction element may be in proper spaced relation to the drum when in retracted position so as to avoid lost motion in effecting a braking application.

An object of the invention is to provide a plurality of friction elements, an automatic adjuster for each element, and means connecting the elements for automatically adjusting the overall length of the elements.

Another object of the invention is to provide means for automatically adjusting the friction elements of a brake of the internal expansible type to compensate for wear of the friction lining on the elements.

A feature of the invention is a pair of brake shoes frictionally clamped to one another in combination with an adjusting screw connecting the shoes and a torsion spring for turning the screw upon relative movement of the shoes.

Other objects and features of the invention will appear from the following description taken in connection with the drawing forming a part of this specification, and in which:

Fig. 1 is a vertical sectional view of a brake embodying the invention;

Fig. 2 is a sectional view substantially on line 2—2, Fig. 1;

Fig. 3 is a sectional view substantially on line 3—3, Fig. 1; and

Fig. 4 is a sectional view substantially on line 4—4, Fig. 1.

In the illustrated embodiment of the invention, 10 represents a fixed support or backing plate adapted to be secured to an axle or to an axle housing, and associated with the backing plate is a rotatable drum 12 adapted to be secured to a wheel.

The backing plate has arranged thereon an anchor 14, suitable steady rests 16 and 18, and conventional adjustable retractile stops 20 and 22. A friction element including a primary shoe 24 and a secondary shoe 26 is frictionally held on the backing plate by the steady rests 16 and 18. Each of the shoes includes a web 28 supporting a rim 30 having secured thereto a friction lining 32 for cooperation with the drum.

The articulate ends of the shoes 24 and 26 are frictionally clamped together. As shown, the articulate ends have extensions 34 and 36 arranged in overlapping relation to one another, and the extensions are provided with registering elongated slots 38 and 40 for the reception of a bolt 42. The head of the bolt bears against one of the extensions, and a washer 44 fitted on the bolt bears against the other extension. A spring 46 sleeved on the bolt, and compressed between the washer 44 and a retaining washer 48 held against displacement as by a cotter pin 50 fitted in a diametral opening through the free end of the bolt. While this structure has proved adequate for frictionally clamping the articulate ends of the shoes together, other means may be employed with equally satisfactory results.

The shoes are connected adjacent their articulate ends by an adjustable link, indicated generally at 52. As shown, the webs of the shoes have oppositely disposed shoulders 54 and 56 notched as indicated at 58 and 60. A screw 62 has a bifurcated end 64 straddling the shoulder 54, with the crotch of the bifurcation seated in the notch 58, and a sleeve 66 having one end internally threaded for the reception of the screw has on its threaded end a flange 68. A plug 70 fitted in the other end of the sleeve with sufficient clearance to provide for free rotation of the sleeve has a flange 72 bearing against the sleeve, and a bifurcated end 74 straddling the shoulder 56 with the crotch of the bifurcation seated in the notch 60. The flange 68 on the sleeve is connected to the flange 72 on the plug by a torsion spring 76 wound on the sleeve. The load on this spring is considerably less than the load on the spring 46, yet ample to rotate the sleeve 66 upon relative movement of the bifurcated ends of the shoes.

The separable ends of the shoes normally embrace the anchor 14, and retractile springs 78 and 80 connect the respective shoes to the anchor. These springs serve to return the shoes to retracted position upon conclusion of a braking operation and to retain the shoes on the anchor 14 and the retractile stops 16 and 18 when in the retracted position.

An automatic adjuster, indicated generally at 82, is mounted on each of the shoes 24 and 26. As shown, the automatic adjuster includes a block 84 frictionally clamped to and movable transversely of the shoe. The block may be frictionally clamped to the shoe as by a bolt and spring washer assembly indicated at 85. The block has an arcuate end 86 for cooperation with the drum, and a beveled end 88 for cooperation with the adjacent retractile stop. As the lining on the shoe wears, the block moves transversely of the shoe proportionately to the wear on the lining. Accordingly, upon return of the shoes to retracted position, the beveled end 88 of the block engages the adjacent retractile stop and supports the shoe in proper spaced relation to the drum. The beveled end 88 also inhibits displacement of the block due to the snapping action of the retractile springs tending to move the block when the shoes are returned to retracted position.

The shoes have adjacent their separable ends oppositely disposed shoulders 90 and 92, and connected between these shoulders is a fluid pressure actuated motor 94 of any preferred type adapted to be connected to a suitable source of fluid pressure.

In a normal braking operation, upon energization of the motor 94, the shoes 24 and 26 are moved to engage the friction linings 32 on the shoes with the drum 12 so as to retard rotation of the drum. Simultaneously with this operation the adjusters 82 mounted on the shoes also engage the drum. The linings 32 on the shoe are subjected to the usual wear incidental to a braking operation, and wear on the adjusters is negligible because of the low coefficient of friction of the material from which the adjusters are manufactured. However, during a braking operation resulting in perceptible wear of the linings there is relative movement between the shoes and the adjusters. The adjusters are frictionally clamped to the shoes, and, accordingly, upon return of the shoes to retracted position, at the conclusion of a braking operation, the adjusters engage the retractile stops 16 and 18 and support the shoes in proper spaced relation to the drum.

Because of the adjustment of the shoes as hereinabove described, when the shoes return to retracted position, due to the load on the retractile springs 78 and 80, there is relative movement between the articulate ends of the shoes against the frictional resistance induced by the spring 46, and when this movement occurs the automatic adjuster 52 operates to take up the slack so that in a subsequent operation no losses occur in transmitting force from one shoe to the other.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a pair of braking elements, adjusters therefor, means frictionally clamping the elements to one another, and expansible means connecting the elements adapted to cooperate with the adjusters to extend the elements.

2. A brake comprising a pair of braking elements, automatic adjusters therefor, means frictionally clamping the elements to one another, and an expansible member including means tending to extend the member connecting the elements and cooperating with the adjusters to extend the elements.

3. A brake comprising a pair of braking elements, automatic adjusters therefor, means for frictionally clamping the elements to one another, a turn screw connecting the elements, and means to turn the screw upon adjustment of the elements.

4. A brake comprising a pair of friction elements, automatic adjusters therefor, means frictionally clamping the articulate ends of the elements to one another, an expansible member connecting the elements adjacent their articulate ends, and a torsion spring urging extension of the expansible member and controlled by the adjusters.

5. A brake comprising a pair of friction elements, automatic adjusters therefor, means for frictionally clamping the articulate ends of the elements together, and means connecting the shoes adjacent the clamping means controlled by the adjusters and operative to urge relative movement of the articulate ends in one direction and inhibiting relative movement in the reverse direction.

6. A brake comprising a pair of friction elements, automatic adjusters therefor, means for frictionally clamping the articulate ends of the elements together, a turn screw connecting the articulate ends of the elements within the radius of the clamping means, and means for urging the extension of the screw controlled by the adjusters.

7. A brake comprising a rotatable drum, a pair of friction elements for cooperation therewith, retractile stops for the elements, members carried by the elements cooperating with the drum and stops for adjusting the elements, means for frictionally clamping the articulate ends of the elements together, and expansible means connecting the elements adjacent the clamping means.

8. A brake comprising a rotatable drum, a pair of friction elements for cooperation therewith, retractile stops for the elements, members carried by the elements cooperating with the drum and stops for adjusting the elements in relation to the drum, means for frictionally clamping the articulate ends of the elements together, and means associated therewith for automatically taking up relative movement between the articulate ends.

9. A brake comprising a rotatable drum, a pair of friction elements for cooperation therewith, retractile stops for the elements, means carried by the elements cooperating with the drum and stops for adjusting the elements in relation to the drum, means frictionally clamping the articulate ends of the elements together, and means interposed between the elements adjacent the articulate ends of the elements urging relative movement thereof in one direction and inhibiting relative movement in the reverse direction.

10. A brake comprising a rotatable drum, a pair of friction elements for cooperation therewith, retractile stops for the elements, members carried by the elements cooperating with the drum and stop for adjusting the elements in relation to the drum, means for frictionally clamping the articulate ends of the elements together, a turn screw connecting the elements adjacent the clamping means, and means for urging extension of the screw.

HARVEY C. SWIFT.